Aug. 17, 1965 C. J. GRISWOLD, JR 3,201,164
CLOSURE LATCH
Filed July 9, 1962
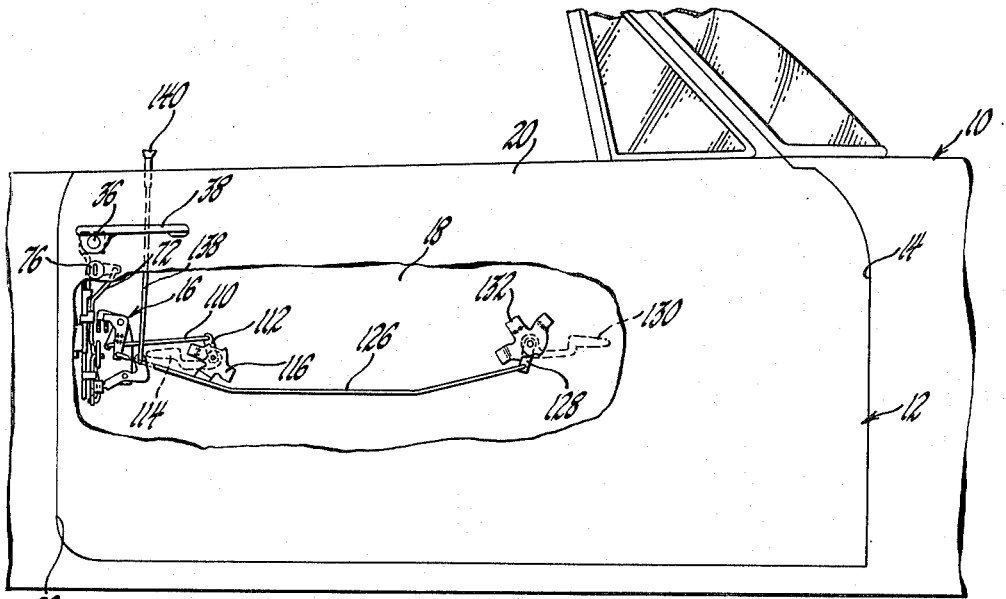
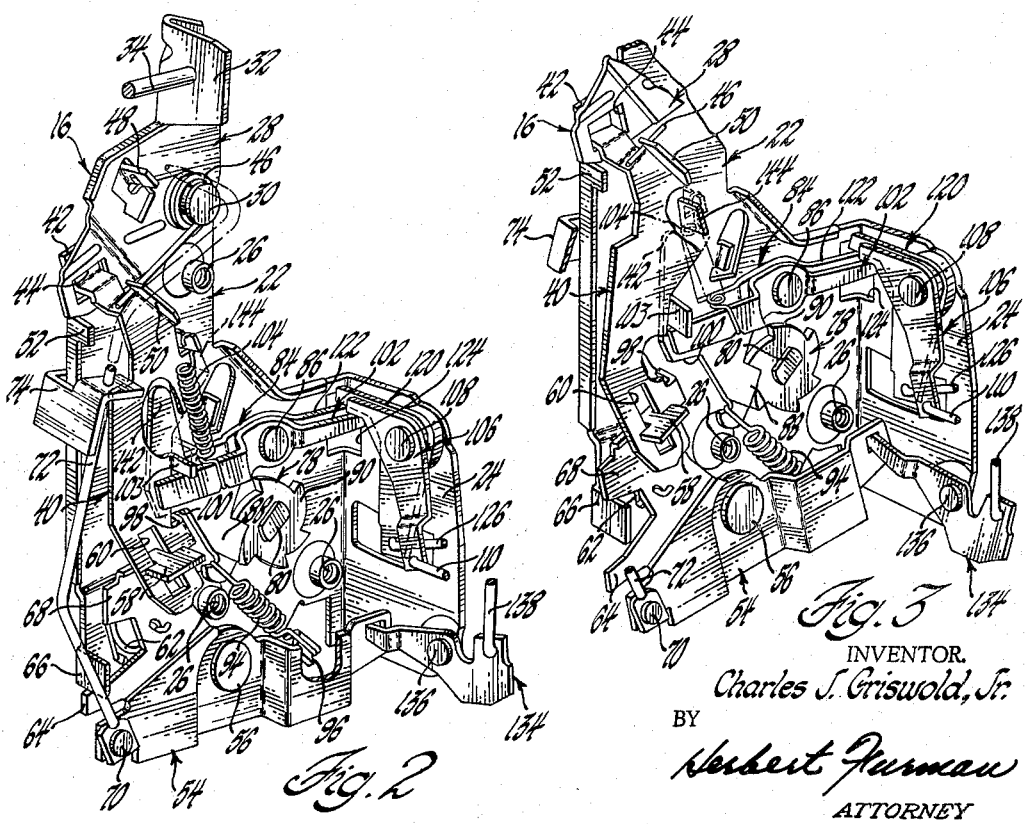
INVENTOR.
Charles J. Griswold, Jr.
BY
Herbert Furman
ATTORNEY

United States Patent Office 3,201,164
Patented Aug. 17, 1965

3,201,164
CLOSURE LATCH
Charles J. Griswold, Jr., Bloomfield Township, Mich., assignor to General Motors Corporation, Detroit, Mich., a corporation of Delaware
Filed July 9, 1962, Ser. No. 208,193
3 Claims. (Cl. 292—280)

This invention relates to closure latches and more particularly to vehicle body door locks.

One feature of this invention is that it provides an improved vehicle body door lock. Another feature of this invention is that it provides a vehicle body door lock having two inside remote handle operating means. A further feature of this invention is that it provides a vehicle body door lock which may be placed in both locked and unlocked positions and which includes two inside remote handle operating means, one of which can always operate the lock regardless whether the lock is in locked or unlocked positions, and the other of which can only operate the lock when in unlocked position and which free wheels when the lock is in locked position. Yet another feature of this invention is that it provides a vehicle body door lock which includes the features of inside and outside locking and unlocking, automatic undogging, and keyless locking, and which further includes two inside operating means.

These and other features and advantages of the door lock of this invention will be readily apparent from the following specification and drawings, wherein:

FIGURE 1 is a partially broken away partial side elevational view of a vehicle body having a door mounted thereon for movement between open and closed positions and embodying a door lock according to this inventin;

FIGURE 2 is an enlarged perspective view of a portion of FIGURE 1 showing the lock in unlocked position, and FIGURE 3 is a partial view similar to FIGURE 2 and showing the lock in locked position.

Referring now particularly to FIGURE 1 of the drawings, a vehicle body 10 includes a front door 12 which is mounted on the body by suitable hinge means, not shown, located adjacent the forward edge 14 of the door for swinging movement between a closed position, as shown, and an open position, not shown. A closure latch generally designated 16 is mounted on the door 12 to releasably hold the door in closed position. Door 12 further includes a door inner panel 18 and a door outer panel 20 which are secured together in spaced relationship by front, rear and bottom walls to define the usual window receiving well for the vertically movable door window.

Referring now to FIGURES 2 and 3 of the drawings, the door lock includes a main frame 22 having a side flange or frame extension 24 which is located angularly thereto. The main frame 22 is adapted to abut the rear wall or jamb face of the door 12 and to be secured thereto by suitable bolts threaded into tapped openings 26 provided in the frame. The side flange 24 of the frame extends along the inner panel 18 of the door.

An outside operating lever 28 is pivotally mounted on a stud 30 which is fixed to the frame 22. Lever 28 includes a lateral flange 32 which is adapted to be engaged by the push rod 34 of a conventional push button assembly 36, FIGURE 1, which is incorporated in an outside door handle 38. An intermittent link 40 includes an upper bent tab 42 which is pivotally and slidably received within an aperture 44 of the lever 28 to couple the intermittent link to the outside operating lever. A coil torsion spring 46 mounted on the stud 30 has one end thereof engaging a notched tab 48 of the frame 22 and the other leg thereof engaging a notched tab 50 of the intermittent link so as to bias the operating lever 32 counterclockwise, as shown in FIGURE 2, and in turn bias the intermittent link 40 downwardly, with the operating lever being located against the action of the spring 46 by engagement of the lever with a bent tab 52 of the frame. A locking lever 54 is pivoted on a stud 56 fixed to the main frame 22 and includes a generally T-shaped lateral tab 58 having the neck thereof received within an elongated slot 60 of the intermittent link to pivotally and slidably couple the locking lever and the intermittent link. An overcenter type torsion spring 62 which is hooked between the locking lever and the main frame 22 selectively and alternatively holds the locking lever in an unlocking position, as shown in FIGURE 2, wherein an ear 64 of the lever engages a lateral tab 66 of the frame, or in a locking position, as shown in FIGURE 3, wherein an ear 68 of the locking lever engages the ear 66. The locking lever is pivoted at 70 to a shiftable rod 72 which is slidably mounted in an apertured bracket 74 secured to the frame 22. The shiftable rod 72 is adapted to be coupled to a conventional lock cylinder 76, FIGURE 1. The shiftable rod 72, upon operation of the lock cylinder 76, will swing the locking lever 54 between its locking and unlocking position.

A detent or toothed wheel 78 is fixed to one end of a shaft 80 which is rotatably mounted on the main frame 22. The other end of the shaft 80 is fixed to a conventional gear tooth rotary bolt, not shown, which is mounted within the usual bolt housing and is adapted to engage a conventional striker, not shown, mounted on the body pillar 82 so as to hold the door in a closed position. A detent lever 84 is pivotally mounted on a stud 86 fixed to the frame 22 and includes a foot 88 which is adapted to engage one of the teeth 90 of the detent to hold the detent against counterclockwise rotational movement and thereby hold the bolt in latching engagement with the striker. A coil tension spring 94 hooked between the lever 84 and a notched lateral tab 96 of the frame biases the lever 84 counterclockwise and into engagement with the detent 78 at all times.

When the lever 54 is in unlocking position, the intermittent link 40 is in its unlocked position, as shown in FIGURE 2, and a lateral tab 98 of the link underlies a shoulder 100 of the lever 84 so that upward movement of the intermittent link will swing the lever 84 clockwise about the stud 86 to move the foot 88 of the lever out of engagement with the tooth 90 of the detent. When the lever 54 is in locking position, the link 40 is in its locked position, as shown in FIGURE 3, and the tab 98 of the link is located to the left of shoulder 100 so that the tab will move past the shoulder 100 of the detent lever and the lever will remain in detented engagement with the detent 78.

An operating lever 102 is coaxially mounted on the stud 86 with the detent lever 84 and one leg of the lever underlies and is held in engagement with a lateral tab 103 of the intermittent link, regardless whether the link is in its locked or its unlocked position, by a coil tension spring 104 hooked between a notch in the one leg of the lever 102 and a notched lateral tab of the link. The other leg of the lever 102 swings relative to the side flange 24 and underlies one leg of a bellcrank lever 106 which is pivotally mounted on a stud 108 fixed to the flange 24. The other leg of the lever 106 is pivoted to one end of a shiftable rod 110, the other end of which is pivoted to a lever 112, FIGURE 1, which is fixed to a rear inside remote operating handle 114 pivoted to a bracket 116 which is fixed to the door inner panel 18. Another bellcrank lever 120 is coaxially mounted with the lever 106 and one leg of the lever 120 overlies a leg 122 of the detent lever 84, with an aperture 124 being provided in both the main frame 22 and the side flange 24 to allow for swinging movement of the levers 84, 102 and 120.

The one leg of the lever 106 which overlies the other leg of the lever 102 swings past the leg 122 of the detent lever 84, and the one leg of the lever 120 swings past the one of the other leg of the lever 102. A shiftable rod 126 has one end thereof pivoted to the other leg of the lever 120 and the other end thereof pivoted to a lever 128, FIGURE 1, which is fixed to a front inside operating handle 130 rotatably mounted on a bracket 132 fixed to the door inner panel 18.

A lever 134 is pivoted at 136 on a stud fixed to the side flange 24. The lower end of a vertically shiftable rod 138 is pivoted to one leg of the lever 134 and the upper end of the rod is secured to a conventional garnish button 140. The other leg of the lever 134 is pivotally and slidably received within an aperture in the outside locking lever 54.

Assuming that the intermitttent link 40 is in its unlocked position, as shown in FIGURE 2, depression of the outside push button 36 will swing the outside operating lever 28 clockwise about the stud 30 to shift the intermittent link upwardly and thereby swing the detent lever 84 clockwise about the stud 86 to move the foot 88 out of engagement with the tooth 90 of the detent so that the door may be moved to an open position. Operation of the front inside remote handle 130 to shift the rod 126 forwardly of the body or to the right will swing the lever 120 counterclockwise about the stud 108 to thereby swing the detent lever 84 clockwise about the stud 86 and move the foot 88 of the lever out of engagement with the tooth 90 of the detent 78 and allow the door to be moved to an open position. Likewise, operation of the rear inside remote handle 114 to shift the rod 110 forwardly of the body will swing the lever 106 counterclockwise about the stud 108 and in turn swing the lever 102 clockwise about the stud 86. The engagement of the lever 102 with the tab 103 of the intermittent link 40 will shift the intermittent link upwardly to thereby swing the detent lever 84 clockwise and out of engagement with the detent 78 to allow the door to be moved to open position.

When the intermittent link 40 is in its locked position, as shown in FIGURE 3, it will be noted that the tab 98 is out of the path of movement of the shoulder 100 of the detent lever. Thus, operation of the push button 36 or operation of the rear inside remote handle 114 to shift the intermittent link upwardly will not result in operation of the detent lever since the tab 98 will move past the shoulder 100 of the detent lever. However, operation of the front inside handle 130 will result in swinging movement of the detent lever 84 to release the detent 78, as previously described. Thus, the front inside remote handle 130 is directly coupled at all times to the detent lever 84 so as to release the detent 78 regardless of whether the lock is in locked or unlocked position, while operation of the rear inside remote handle 114 will only result in release of the detent 78 when the lock is in an unlocked position since the rear inside remote handle operates the detent lever 84 through the intermittent link 40. This provides a safety feature against accidental opening of the door 12 by a rear seat passenger while the car is being operated and the driver is unaware of the actions of the rear seat passenger.

Operation of the key lock cylinder 76 to swing the outside locking lever 54 will result in movement of the intermittent link between its unlocked position, as shown in FIGURE 2, and its locked position, as shown in FIGURE 3. Likewise, depression and raising of the garnish button 140 to swing the lever 134 about the stud 136 will result in the same movement of the outside locking lever.

When the door is open, keyless locking is accomplished by first depressing the garnish button 140 so as to swing the intermittent link 40 to its locked position, as shown in FIGURE 3, then depressing and holding the push button 36 to swing the outside operating lever 28 clockwise and shift the intermittent link 40 upwardly so that a foot 142 of the detent lever is out of the path of movement of a tab 144 of the intermittent link, and then closing the door. The ratcheting of the foot 88 of the detent lever past the teeth 90 of the detent 78 as the bolt engages the striker will swing the detent lever 84 alternately clockwise and counterclockwise about the stud 86, but the clockwise swinging movement will result in the foot 142 swinging past the tab 144 without any engagement between the two. Button 36 is then released when the door is in closed position.

Automatic undogging is accomplished when the door is open, the button 140 is depressed, and thereafter the door is closed without depressing the push button 36. Inasmuch as the tab 144 is now in the path of movement of the foot 142 of the detent lever, the detent lever will swing the intermittent link 40 to its unlocked position as the foot 88 of the detent lever ratchets past the first tooth of the detent 78.

Thus, this invention provides an improved vehicle door lock.

What is claimed is:

1. A closure latch comprising, latch means, detent means movable between latch engaging and latch releasing positions and including a swingable lever, outside operating means, means for selectively coupling said outside operating means to said lever to move said detent means to latch releasing position, first inside operating means directly coupled to said lever for moving said detent means to latch releasing position, a second swingable lever coaxial with said first lever, and second inside operating means adapted to be coupled to said first lever through said second lever and said selective coupling means for moving said detent means to latch releasing position.

2. The structure recited in claim 1 wherein said selective coupling means includes an intermittent member and said second swingable lever includes a portion thereof juxtaposed to a portion of said intermittent member and engageable therewith to actuate said intermittent member and said selective coupling means to move said detent means to latch releasing position.

3. The structure recited in claim 2 wherein said first inside operating means includes a swingable operating lever and said second inside operating means includes a swingable operating lever coaxial with said first-mentioned operating lever.

References Cited by the Examiner

UNITED STATES PATENTS 2,862,750 12/58 Minke _____ 292—336.3 X
2,928,690 3/60 Larson _____ 292—336.3
2,980,460 4/61 Campbell.

M. HENSON WOOD, Jr., *Primary Examiner.*